V. SANPHY.
VEHICLE WHEEL.
APPLICATION FILED JAN. 31, 1912.
1,032,863.
Patented July 16, 1912.
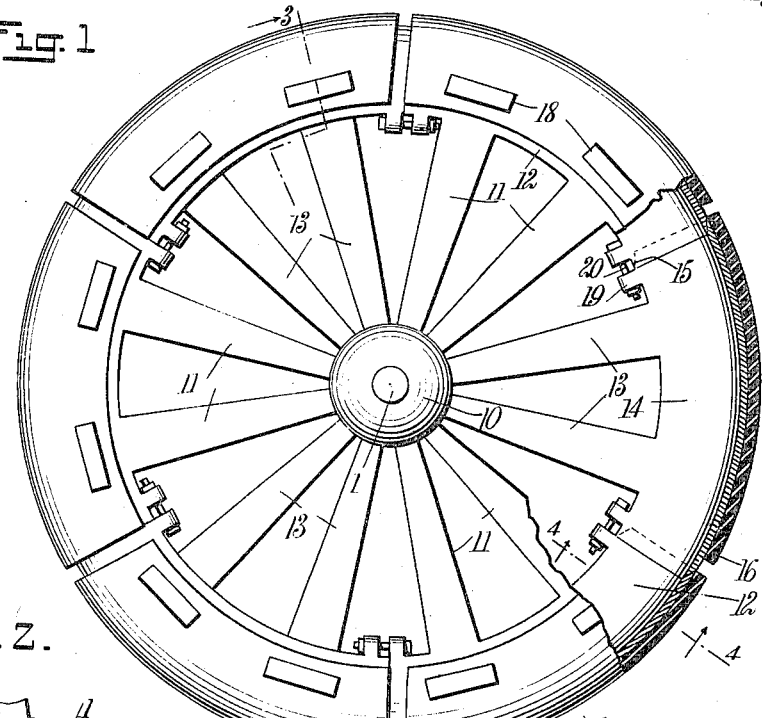
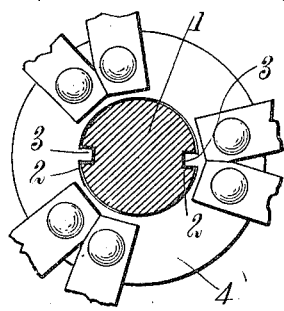
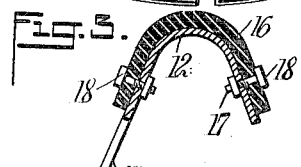
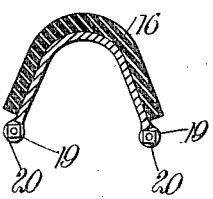
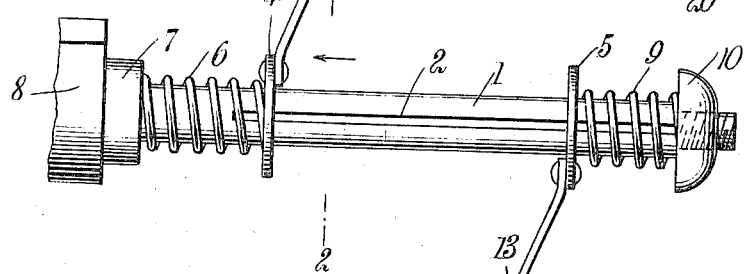
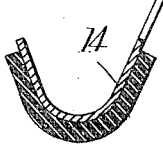
WITNESSES
Sidney Brooks
A. S. Kitchin
INVENTOR
Vincent Sanphy
BY Munn & Co
ATTORNEYS

UNITED STATES PATENT OFFICE.

VINCENT SANPHY, OF SOUTH BEND, WASHINGTON.

VEHICLE-WHEEL.

1,032,863.

Specification of Letters Patent. Patented July 16, 1912.

Application filed January 31, 1912. Serial No. 674,430.

*To all whom it may concern:*

Be it known that I, VINCENT SANPHY, a citizen of the United States, and a resident of South Bend, in the county of Pacific and State of Washington, have invented a new and Improved Vehicle-Wheel, of which the following is a full, clear, and exact description.

This invention relates to an improvement in vehicle wheels, and particularly to resilient wheels, and has for an object the construction and arrangement of improved means which will present a wheel structure adapted to resiliently give when the wheel is in use.

Another object of the invention is the provision of an improved resilient spoke and rim structure associated with a pair of springs whereby means are provided which will resiliently give when the wheel is passing over rough roads or over obstructions.

A still further object of the invention is to provide a wheel which will not require the use of pneumatic tires and yet will provide a substantially equally resilient effect, the same being taken up by the spring action of a section of the wheel and auxiliary laterally moving springs associated with the various sections.

In carrying out the objects of the invention a shaft is provided formed with one or more guiding grooves which accommodate projections extending from a pair of washers or rings mounted on the shaft. Encircling the shaft near each end thereof is a spring which normally bears against the rings or washers for tending to force the same together and for resiliently resisting outward movement. These springs are held in place by suitable adjustable members so that the same may act properly at all times. To each of the washers or rings are connected one or more spokes merging into part of the rim of the complete wheel, the parts of the rim being connected by suitable connecting bolts whereby a continuous structure is provided. In order to prevent noise a rubber covering for the rim is used.

A practical embodiment of the invention is represented in the accompanying drawings forming a part of this specification in which similar characters of reference indicate corresponding parts in all the views.

Figure 1 is a side view of an embodiment of the invention, certain parts being shown in section for better disclosing the invention; Fig. 2 is an enlarged fragmentary sectional view approximately on the line 2—2 of Fig. 3; Fig. 3 is a fragmentary sectional view through Fig. 1 approximately on the line 3—3; and Fig. 4 is a fragmentary sectional view through Fig. 1 on the line 4—4.

Referring to the accompanying drawings by numerals 1 indicates a shaft provided with ways 2 into which is fitted keys or projections 3 extending from rings or washers 4 and 5. Bearing against the ring 4 is a spring 6 which is held in place by a suitable nut 7. The shaft 1 extends into a suitable bracket or other support 8 connected with the vehicle. Bearing against the spring 5 is a spring 9 held in place by a nut 10 threaded on to the outer end of the shaft 1. Preferably the nuts 7 and 10 are arranged with right and left threads so that a forward movement of the wheel will not loosen the nuts. These nuts are screwed up or unscrewed in order to vary the expansion and contraction or resilient effect of the spokes and springs. Rigidly secured to the ring 4 are a plurality of spokes 11 merging into a rim 12, while secured to the ring 5 are a plurality of spokes 13 merging into the rim 14. It will be evident that the spokes 11 and 13 could be made independent of the rims or rather rim portions 12 and 14, and then secured thereto. The spokes 11 and 13 are preferably made in pairs although a greater or less number could be provided for each of the rim portions 12 and 14. In arranging the spokes 11 and 13, and the rim portions 12 and 14, the same are alternately arranged on the wheel as clearly shown in Fig. 1, so that one set of spokes 13 will be positioned opposite the space between two sets of spokes 11, and vice versa. In this way the rim portions 12 and 14 form a continuous outer rim. At the juncture of the outer rims the same overlap at 15 so that when any one or more of the portions 12 and 14 are compressed or moved inwardly the sections may give or slightly telescope over each other. It will be seen by the construction and arrangement shown and described that the spokes 11 and 13 will resiliently give to a certain extent, and the springs 6 and 9 will resiliently give so that the entire wheel will be more or less resilient according to the size of the wheel and the thickness of the metal of which the same is made. It will of course be understood that in heavy vehicles like large automobiles, the various spokes, springs and other parts will be made heavy, and yet give a satisfactory resilient effect. In vehicles of lighter weight the various parts should be made of lighter material.

In order to prevent the wheel from making any unnecessary noise, sections of rubber covering 16 are provided which may be secured in place in any desired manner, preferably by bolts 17 having elongated heads 18. By securing the rubber covering 16 in place in this manner the wheel is permitted to stretch or give as occasion may require, according to the position of the various rim portions 12 and 14.

The sections or rim portions 12 and 14 are each provided with lugs 19 at each end which accommodate bolts 20 which hold the sections together properly. These bolts will prevent any unnecessary spreading of the parts of the wheel but will permit the various sections or portions 12 and 14 to move together.

Having thus described my invention I claim as new and desire to secure by Letters Patent:—

1. In a vehicle wheel, a central shaft, a pair of rings slidingly mounted on said shaft, means for resiliently pressing said rings toward each other, a plurality of spokes connected to said rings, a rim section rigidly connected with each of said spokes, and means for connecting said rim sections together end for end.

2. In a vehicle wheel, a central shaft, a spring arranged at each end of said shaft, a plurality of independent rim sections, means for connecting the same together end for end, and a plurality of spokes extending from said rim sections to a position adjacent said shaft, and means for causing said springs to act on the ends of said spokes adjacent said shaft for resiliently urging the same together.

3. In a vehicle wheel, a central shaft, a spring arranged at each end of said shaft, means for holding said spring in position on said shaft, a pair of rings pressed by said spring, a plurality of independent rim sections, means for connecting the same together, and a plurality of spokes connecting said rim sections with said rings, the spokes of one section being connected with one ring and the spokes of the adjacent section being connected with the opposite rim whereby the spokes on one side will be opposite the space between the spokes on the opposite side.

4. In a vehicle wheel, a shaft formed with keyways therein, a pair of rings arranged with projecting lugs fitting into said keyways, a spring at each end of said shaft surrounding the same and pressing against said rings, a plurality of independent rim sections arranged to overlap at their contact points, and spokes for joining said rim sections with said rings whereby the movement of the rim sections will be resiliently cushioned by said springs upon the spreading of said rings.

In testimony whereof I have signed my name to this specification in the presence of two subscribing witnesses.

VINCENT SANPHY.

Witnesses:
 JOHN I. O'PHELAN,
 VICTOR C. COUVRETTE.